United States Patent [19]
Poricelli

[11] Patent Number: 5,431,487
[45] Date of Patent: Jul. 11, 1995

[54] HYDRAULIC BRAKE LOCK WITH ELECTRIC VALVE CONTROLLER

[76] Inventor: Ciro Poricelli, 68 Connell Ave., Yonkers, N.Y.

[21] Appl. No.: 261,687

[22] Filed: Aug. 15, 1994

Related U.S. Application Data

[63] Continuation-in-part of Ser. No. 183,140, Jan. 14, 1994, abandoned, which is a continuation of Ser. No. 991,425, Dec. 16, 1992, abandoned.

[51] Int. Cl.6 ............................................. B60T 17/16
[52] U.S. Cl. ........................................ 303/89; 188/353
[58] Field of Search .................. 303/89; 188/265, 353; 180/287

[56] References Cited

U.S. PATENT DOCUMENTS

| | | | |
|---|---|---|---|
| 2,080,603 | 5/1937 | Cometto et al. | 188/353 |
| 2,585,711 | 2/1952 | Whitney et al. | 303/89 X |
| 3,557,584 | 1/1971 | Triglia | 303/89 X |
| 3,559,755 | 2/1971 | Pond | 303/89 X |
| 3,682,195 | 8/1972 | Cvetkovich | 303/89 X |
| 3,770,324 | 11/1973 | Stevenson et al. | 303/89 X |
| 4,040,675 | 8/1977 | Richmond et al. | 303/89 |
| 4,258,819 | 3/1981 | Baptiste, Sr. | 303/89 X |
| 4,446,950 | 5/1984 | Wise et al. | 188/181 A X |
| 4,546,846 | 10/1985 | Myers | 303/89 X |
| 4,633,686 | 1/1987 | Carr | 188/353 |
| 4,721,192 | 1/1988 | Cano et al. | 303/89 X |
| 4,934,492 | 6/1990 | Hayes-Sheen | 303/89 X |
| 5,154,493 | 10/1992 | Futrell et al. | 303/89 |

Primary Examiner—Josie A. Ballato
Attorney, Agent, or Firm—Levisohn, Lerner, Berger & Langsam

[57] ABSTRACT

An anti-theft device for a motor vehicle equipped with hydraulic brakes. A key switch is electrically connected to the vehicle's battery and to a small motor. When the key switch is turned, power from the battery causes the motor to reciprocate a piston which is connected to a valve. The positiion of the piston either blocks or unblocks the flow of hydraulic fluid between the brakes and the hydraulic fluid reservoir while one-way flow is allowed between master reservoir and brakes whether the device is armed or unarmed. The key switch and connecting wiring are isolated from the ignition system, preferably passing through the structural frame of the vehicle.

7 Claims, 3 Drawing Sheets

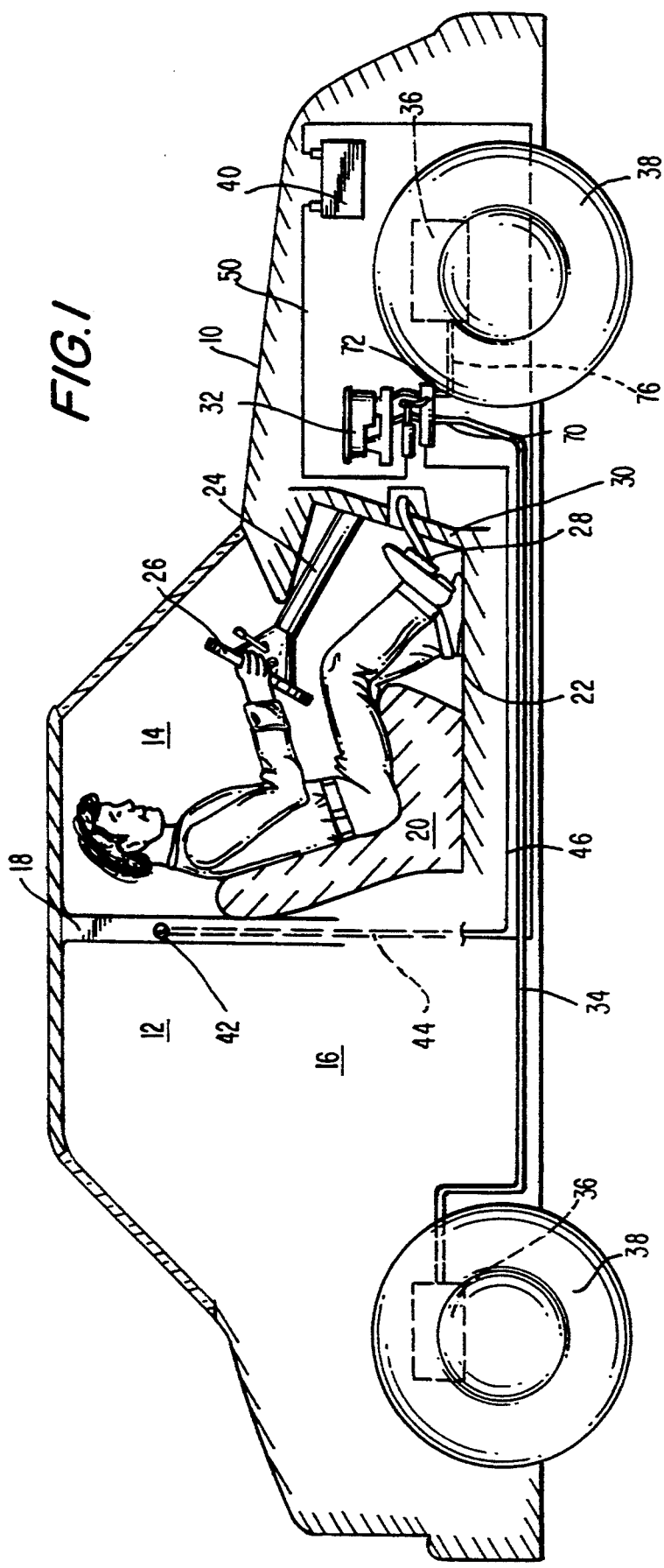
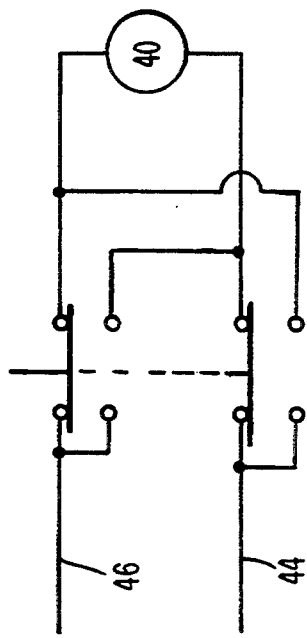

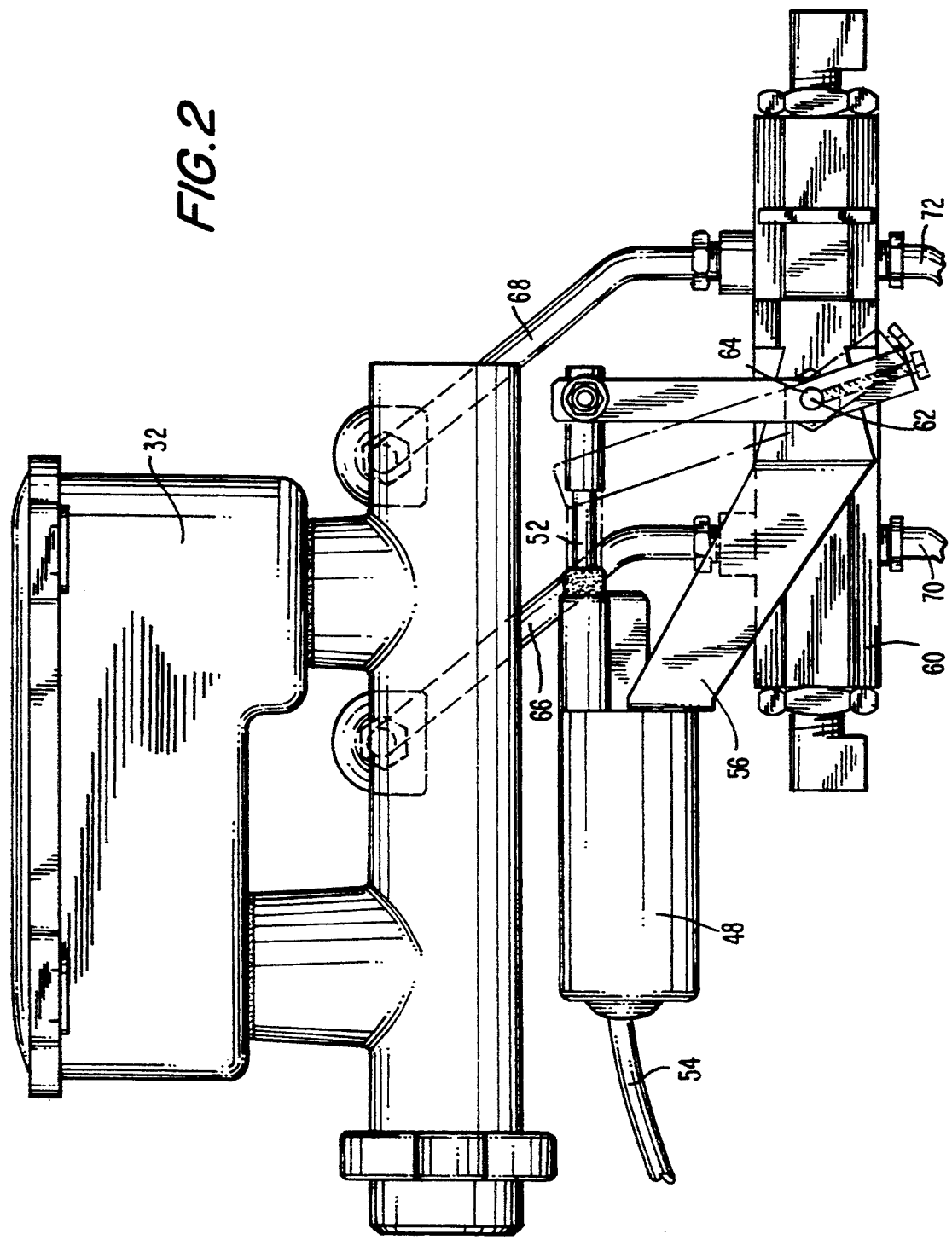

HYDRAULIC BRAKE LOCK WITH ELECTRIC VALVE CONTROLLER

RELATED APPLICATIONS

This is a continuation-in-part application of U.S. patent application Ser. No. 08/183,140 filed Jan. 14, 1994, now abandoned, which is a continuation application of U.S. Ser. No. 07/991,425 filed Dec. 16, 1992, now abandoned.

BACKGROUND OF THE INVENTION

The present invention generally relates to an anti-theft device for motor vehicles and, more specifically, it relates to a hydraulic brake locking device which, when engaged, positively locks the hydraulic brakes of a motor vehicle so that even if the motor is "jump-started", the vehicle can not be moved since the brakes of the vehicle and thus the wheels are locked.

Basically, the present invention contemplates an electro-mechanical mechanism for selectively, hydraulically locking and unlocking the brakes of an automobile. A key switch is electrically connected to the vehicles' battery. It provides power to a small motor. When power is provided to the motor, it reciprocates a piston which blocks (or unblocks) a valve's ports. This prevents hydraulic fluid from returning to the master cylinder but allows the fluid to pass from reservoir to the brakes upon depressing the brake pedal. When the hydraulic lines are blocked, the brakes are locked and the vehicle cannot be moved. When the valve's ports are unblocked, fluid flows normally so that the operator can operate the vehicle's brakes.

DESCRIPTION OF THE PRIOR ART

Numerous motor vehicle brake systems have been provided in the prior art that include an apparatus for energizing the brakes in a packed or locked position to prevent theft of the motor vehicle. For example, U.S. Pat. Nos. 4,721,192; 4,258,819; 4,446,950 and 4,546,846 are all illustrative of such prior art. While these units may be suitable for the particular purpose to which they address, they would not be as suitable for the purposes of the present invention as will be more fully described. For example, U.S. Pat. No. 4,721,192 shows an anti-theft device for vehicles. A key switch is provided which mechanically engages a valve, secured in the fluid line and connected to the brakes of a vehicle. According to the '192 patent, the key switch is preferably located in the dashboard of the vehicle with the mechanical linkage to the valve extending through the firewall.

As will be more fully described hereinafter, the present invention, in contrast, provides an electrical connection between a key switch and a valve. The valve opens and closes to allow hydraulic fluid to freely pass between master cylinder and brakes or to be blocked from passage. Utilization of electric wiring to connect the key switch to the valve accomplishes many purposes and is a significant advance over the prior art. For example, the electrical wiring, interconnected between the key switch and the fluid valve allows the valve to be located proximal to the master cylinder. There it is less subject to tampering. The use of wiring, not a mechanical linkage, between the key switch and the hydraulic valve also allows the wires to be more easily passed through the interior compartment or the frame of the vehicle. This also allows the key switch to be located in a side vertical frame support, located between the front seat and the rear seat. The mechanical arrangement shown in the '192 patent, on the other hand, necessarily requires that the key switch be located near the valve since the mechanical interconnect is the manner by which rotation of the key opens and closes the valve. In a mechanical interconnect, if the key switch is located far away from the valve, tampering, mechanical breakage or inoperativeness may occur. The present invention, as will be described, provides a mechanism for protecting the interconnect (electric wires) between the key switch and the valve by locating the wires in the vertical support of the vehicle frame. This is far more secure and provides a more effective deterrent to a would-be car thief. Also, by locating the key switch distal from the valve (only feasible because of the use of electric wires running through the interior of the vehicle) the motor can draw power for activating the valve from the vehicle's automobile battery. The '192 patent, by utilization of a mechanical interconnect between the key switch and the valve allows for the possibility that a car thief can mechanically force or "jimmy" the valve to open it up. In contrast, the present invention relies exclusively on electrical power for causing the valve to open and close.

As is well understood by law enforcement officers, the time that it might take a thief to steal a car is directly related to the possibility and probability that the car will be stolen. Thus, location of the wiring behind the structural frame of the vehicle, as in the present invention, provides a serious time deterrent to a would-be thief. Therefore, the probability and possibility of an automobile so equipped being stolen or even attempted to be stolen is significantly diminished. Concealment of the wiring within the vehicle and providing the key switch in and through the vertical support of the frame of the vehicle is a significant theft deterrent. This deterrent is, of course, cumulative to that provided by the wheel locking mechanism itself.

A thief would not even attempt to cut the hydraulic or brake lines of the vehicle, in an effort to overcome the wheel lock mechanism, since that would render the brakes useless. It is important, from a car thief's perspective, that the vehicle be fully operational for it to be valuable enough to steal for subsequent resale purposes. Of course, if the brakes are non-operational, the car thief will not even risk driving the vehicle since he is not certain whether or not the vehicle will stop, on demand. Driving the vehicle is not feasible if the wheels are locked.

U.S. Pat. No. 3,557,584 also relates to a safety lock for vehicles. It, too, seeks to employ a valve located in between the master cylinder and the brakes of the vehicle. This valve opens and closes by mechanical manipulation of the ignition key. Currently, ignition key mechanisms can be "hot wired" by thieves. This will start the vehicle. Actually, "hot wiring" is a misnomer since wires are not physically touched together but, rather, a tool is used for mechanically forcing the ignition key mechanism to unlock. Thus the wheel lock and hydraulic valve mechanism of the '584 patent is suspect as an anti-theft deterrent since it can be as easily overridden in the same way that hotwiring can occur with the ignition key. Therefore, the present invention, separating the valve from the key switch by concealed wires and separating the key switch from the ignition key is a significant advance in the anti-theft devices of the prior art in the vehicle field.

U.S. Pat. No. 4,040,675 provides a key switch located remotely from the ignition key. This makes it less susceptible to tampering. There is a mechanical connection between the key switch and the hydraulic valve. Mechanical interconnection is performed by suitable camming and a mechanical connecting cable. The mechanical interconnect selectively places the valve into operative and inoperative positions for hydraulic fluid flow. Again, the replacement of the mechanical interlock of '675 by electrical wires, as in the present invention, and routing the electrical wiring through the structural components of the vehicle frame is a significant advance over the prior art. It allows the key switch to be more easily remotely located from the master cylinder, allows for the key switch to be hidden within the vehicle, as desired and, in addition, allows the entire anti-theft apparatus to be very easily retro-fitted into existing automobiles. It eliminates mechanical failure as a potential problem with the anti-theft devices. Utilization of electrical power to activate a simple valve located immediately adjacent to the master cylinder is far simpler and more efficient at providing the desired anti-theft deterrent.

U.S. Pat. No. 4,633,686 also relates to an anti-theft brake lock. A mechanical locking of the hydraulic valve, located between the master cylinder and the brakes, is employed. In the illustrated embodiment, a male and female mechanical camming arrangement is provided. The same problems previously referred to for mechanical interconnects are equally applicable here. Similarly, the same advantages of the present invention over the mechanical interconnect are also applicable here.

U.S. Pat. No. 3,770,324 shows a manual/mechanical locking system of the brakes. Here, too, a mechanical valve is actuated by the mechanical interconnect of a key switch. U.S. Pat. No. 3,682,195 also shows a mechanical interconnection to lock and unlock the hydraulic valve. U.S. Pat. No. 3,557,584 shows an ignition key which mechanically interconnects to the hydraulic fluid lines. U.S. Pat. No. 2,585,711 shows an electro magnetic valve electrically coupled to the ignition key. It neither teaches nor suggests the simplicity and effectiveness of the present invention. The '711 device associates the locking control with the clutch pedal. The valve is a solenoid-type device and, therefore, if electric power is lost, the valve will change position. The present invention, in contrast, only uses electric power to change valve position and not to maintain the valve in its operation.

U.S. Pat. No. 2,080,603 shows a mechanical mechanism for the hydraulic locking of brakes. The wires of the device are not electrical current-carrying wires but rather are mechanical wires for interconnecting rotation of the key to the position of the valve.

U.S. Pat. No. 4,446,950 shows a brake control apparatus. This device relates to prevention of forward creep in a vehicle after it has been first braked to a stop, such as at a traffic light. An electronic system is provided for sensing the vehicle's speed and other conditions and the device either enables or disables the creep control mechanism, accordingly.

U.S. Pat. No. 4,258,819 relates to a vehicular brake system. When the ignition key of the vehicle is turned to the "off" position, an electric motor drives a pump to pressurize the hydraulic brake system of the automobile and thereby automatically apply the brakes. When the ignition key is subsequently switched to the "on" position, the electric motor again drives the pump to release the pressure in the brake lines. Pressure sensitive switches are provided to close check valves and turn the pump motor off, once the brake system has been engaged or disengaged. The present invention isolates the key switch of the brake locking system from the ignition key of the vehicle. This allows the key switch to be hidden or remotely located and, in addition, allows the wiring to be protected by the frame of the vehicle.

U.S. Pat. No. 4,546,846 relates to an anti-theft hydraulic brake control system. A manual arming and de-arming lock and mechanical cable system attach the master cylinder body through a terminating attachment. The mechanical cable assembly, through the terminating attachment, activates an activation piston assembly member in the master cylinder body. The '846 patent specifically teaches that its control member is manually armed and requires no external electrical energy to operate. In contrast, the present invention contemplates that the connection between the arming and de-arming lock and the activation piston assembly member is an electrical cable. The device operates by drawing electrical power from the battery of the vehicle. This, as previously mentioned, allows the present invention to be remotely located, vis-a-vis the dashboard, the master cylinder and, indeed, in the preferred embodiment of the present invention contemplates that the arming and de-arming lock be located in and through a vertical structural support of the vehicle body frame. In addition, utilization of an electrical cable for connecting the arming and de-arming lock to the activation piston assembly for the valve precludes the possibility that potential thieves could mechanically force the activation piston assembly member into its unlocked position. Rather, it will be required, to move the activation piston assembly member, that electrical energy be provided. According to the preferred embodiment of the present invention, the electrical cables are sheathed in a metallic cable-like housing and, therefore, access to the electrical wires is substantially inhibited. This will substantially reduce the possibility of vehicle thefts in that, to gain access to the electrical wires, additional time is required by the thieves to sever the sheathed wires. Studies have clearly indicated that if additional time is required for a thief to disengage the anti-theft prevention mechanism of a vehicle then the thief will likely choose another vehicle which is not so equipped.

SUMMARY OF THE PRESENT INVENTION

According to the present invention, a key lock arming and de-arming device is located in one of the vertical structural supports of the vehicle frame body. Electric wires are connected to the key lock device. One wire connects the key switch to the battery terminal of the vehicle while the other wire is connected to one of the leads of the piston activating mechanism. The battery is wired to the other lead of the piston activating mechanism. The piston activating mechanism is located very close to the vehicle's master brake cylinder. The piston is connected to a simple, two-position "open" or "shut" hydraulic valving mechanism. The valving mechanism is connected in line with the master brake cylinder and the hydraulic brake lines of the vehicle.

When the key switch is in the "unarmed" position, hydraulic fluid can easily flow through the valve between the master cylinder and the brake lines to brake the wheels as the vehicle operator's foot is pressed on the brake pedal. Similarly, when the operator's foot is removed from the brake pedal, hydraulic fluid is released from the brake lines of the vehicle and is capable of returning to the master cylinder via the valve.

When the key switch is turned to its "armed" position, energy from the vehicle battery is provided to the piston activating mechanism which causes the reciprocating rod to move forwardly. This, in turn, causes the valving mechanism to shut the hydraulic fluid "off", thereby preventing the free flow of fluid and specifically preventing the fluid from returning to the master cylinder. Fluid can, however, go through the one-way valves from fluid reservoir to the brakes. Once the operator's foot is pressed on the brake, after the system is first "armed", the brakes of the vehicle are "locked" in position.

When the authorized operator of the vehicle desirably seeks to unlock the anti-theft system, the arming and de-arming key switch is turned from the "armed" position to the "unarmed" position. This also provides electrical energy from the vehicle's battery to the activation piston mechanism. It causes the reciprocating rod to move back to its original position thereby unblocking the hydraulic fluid flow between master cylinder and brake lines. In this position, hydraulic fluid is allowed to freely flow between the master cylinder and the hydraulic lines of the brake system and the brake system is fully operational.

It is the preferred embodiment and a specific feature of the present invention to locate the key switch in a vertical support of the vehicle frame so that unauthorized access to the electrical wiring is extremely difficult and can only be made by destroying the vehicle frame. In this manner, it is believed that would-be auto thieves would not even attempt to steal a vehicle so equipped since the value of a stolen vehicle having structural damage is significantly diminished with respect to a vehicle having full structural integrity. Furthermore, by locating the electrical wires within the structural support of the vehicle frame, the key switch can be remotely located with respect to the ignition key cylinder, the master brake cylinder, the piston activator, and the valve and, in this manner, the key switch can be located in a "hidden" position within the vehicle, known only to authorized users.

It is yet another aspect of the present invention to sheath the electrical wires between the key switch and the vehicle's battery, as well as the electrical wiring between the key switch and the piston activator mechanism. Unauthorized "hotwiring" of the anti-theft vehicle system cannot be easily accomplished. In addition, the flexibility of using electrical wiring between the key switch and the piston activator and battery allows the wiring to be easily snaked through the vehicle body, in contrast to mechanical interconnect mechanisms for activating a hydraulic locking device.

These and other objects are accomplished by the present invention which will be more fully disclosed by reviewing the accompanying drawings and the specification related thereto.

BRIEF DESCRIPTION OF THE DRAWINGS

FIG. 1 is a cross sectional and side elevational view of an automobile, showing the preferred manner of installation of the present invention and also showing the hydraulic lines from the master cylinder to the brakes of the wheels;

FIG. 2 is a side plan view showing the master cylinder, the activating piston mechanism and the valve of the present invention;

FIG. 3 is an electrical schematic showing the manner by which the key switch of the present invention is electrically connected to the vehicle battery and to the activating piston mechanism.

DETAILED DESCRIPTION OF THE DRAWINGS AND THE PREFERRED EMBODIMENT

Figure 4:
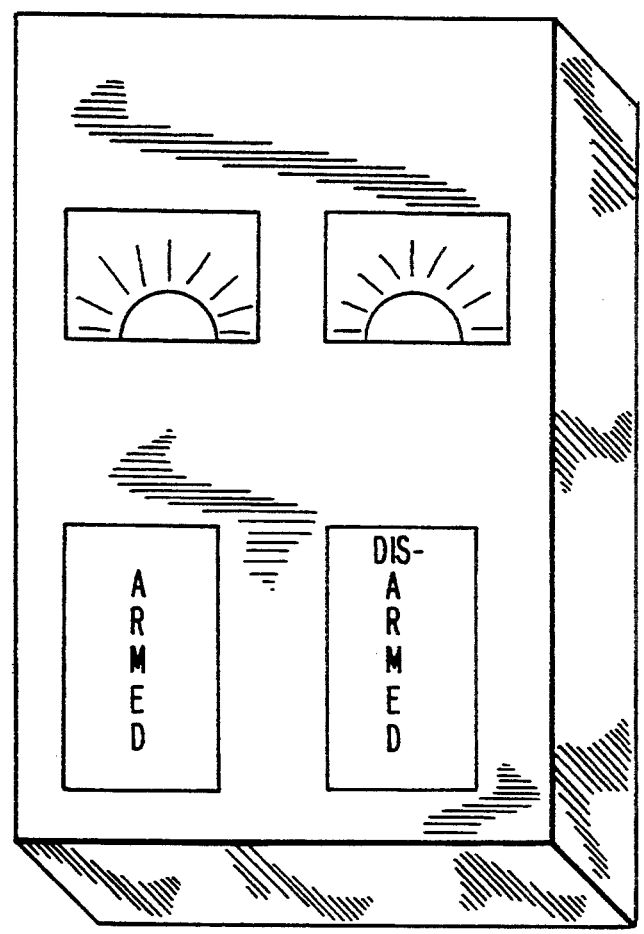
FIG. 4 is a perspective view of a remote control mechanism useful for arming and disarming the present invention.

As best seen in FIG. 1, a vehicle 10 has a passenger compartment 12 separated into a front cabin portion 14 and a rear passenger cabin portion 16 by a vertical, hollow side frame support 18. The frame support 18 is located on the driver's side of the vehicle and, as will be easily understood by those of ordinary skill in the art, a corresponding frame support (not shown) is located on the passenger side of the vehicle. This is, of course, conventional vehicle construction.

The vehicle is provided with many other conventional features which are illustrated to facilitate understanding of the present invention. For example, a driver's bucket seat 20 is secured to the floor 22. A steering column 24 having attached thereto a steering wheel 26 is also provided. A brake pedal 28 is shown as passing through the firewall 30. The brake pedal 28 is connected, via hydraulic and mechanical linkages to the master brake cylinder 32, which supplies hydraulic fluid to the brake lines 34 when the brake pedal 28 is selectively pressed by the driver. As is well known to those of skill in the art, the master brake cylinder 32 is a reservoir for hydraulic fluid and supplies the fluid, under pressure, when the brake pedal is pressed, via the brake lines, to the brakes of the wheels 36. In a well-known manner, depressing the brake pedal of a vehicle, equipped with "power" brakes causes the hydraulic fluid to be passed under pressure to the brakes of the wheels and forces the vehicle to slow down, even to a stop, depending upon the pressure applied by the driver. When the driver's foot is removed from the brake pedal, it returns to its original position and the hydraulic fluid is allowed to return to the master brake cylinder. This releases the brakes of the vehicle. The brakes 36 of the wheels 38 are, therefore, in fluid or hydraulic communication with the hydraulic fluid of the master brake cylinder 32 via the brake lines 34 and 76.

A battery 40 is part of the standard equipment of the vehicle and supplies power to the anti-theft device of the present invention in a manner which will be further described. The same battery, of course, still provides its otherwise conventional and normal electrical functions and it is intended that the anti-theft device of the present invention does not impact on that capacity.

A key switch 42 is permanently secured in and through the sheet metal of the vertical hollow frame support 18. Preferably it will be located where it would be convenient for the driver to insert a key into the key switch to selectively arm or disarm the anti-theft device, as desired. The slot of the key switch 42 is substantially the only portion of the key switch which is accessible to a driver or a thief. The cylinder of the lock, the electrical contacts and the wires 44 and 46 connected to the terminals of the key switch are all located within the hollow frame support 18. One wire 44, is connected to one terminal of the electric key switch 42 with its other end secured either directly to the battery 40 or to an electrical harness, which, in turn, is connected to the battery 40. For simplicity purposes, the present invention is illustrated in FIG. 1 with wire 44 being directly connected to the battery 40. Another wire 46 is connected to the other electrical contact of the key switch 42 and has its other end connected to one of the electrical contacts of an electric motor 48 of the piston activation mechanism. The piston activation mechanism is located immediately adjacent and beneath, in the preferred embodiment, the master brake cylinder 32. An electrical wire 50 electrically completes the circuit and connects the other terminal of the battery 40 to the other electrical contact of the motor 48. Thus, when the electrical key switch 42 is turned to a first position, contact is made between wires 44 and 46 and electrical power is supplied from the battery 40 to the motor 48. When the key switch is turned to its other position, electrical power is also supplied from the battery to the motor 48, as illustrated in FIG. 3.

The electrical key switch 42 is capable of assuming either of two alternative positions, namely an "armed" position when the anti-theft device is desirably activated to prevent movement of the wheels by locking the brakes or a "disarmed" position, when the anti-theft device is disabled. This is the position when the authorized driver wants to drive the vehicle and have proper brake functioning, i.e., the anti-theft device will not then impact on the hydraulic brakes. When the electrical key switch is, for example, turned to its clockwise position, power is supplied from the battery 40 to the motor 48 which, in turn, causes the forwardly reciprocable piston rod 52 to push forwardly with respect to the motor. Alternatively, however, when the electrical key switch 42 is turned to its counterclockwise position, disarming the anti-theft device, power is again supplied to the motor 48 but, in this situation, the two-directional motor 48 causes the reciprocating piston rod 52 to retract with respect to the motor. This is schematically illustrated in FIG. 3.

The wires 44, 46 and preferably, 50, too, are desirably sheathed in metal conduits so that access to the wires is inhibited by unauthorized individuals. In one embodiment of the invention, the wires are all of the same color so that even if access is obtained by an auto thief, he wouldn't be able to easily tell which wires to connect together to bypass the brake-locking feature. The flexible sheathing of the wires still allows them to be easily snaked through and within the hollow structure of the vehicle frame so that the key switch 42 is electrically connected to the source of electric power, namely, the battery and, in addition, the wires are placed in electrical connection to the motor 48 while the key switch can be hidden and isolated from the ignition switch. In one embodiment of the invention, the key switch is located in the vehicle's door frame so that it is fully hidden from view and access thereto is only obtained by first gaining access to the vehicle by unlocking the door.

As best seen in schematic FIG. 3, the key switch 42 provides electrical power, via the battery 40, to the motor 48 when the switch is either in its first position for arming the anti-theft device or in its second position for disarming the anti-theft device. In either position, the key switch completes the electrical circuit and provides power to be transmitted to the motor. The motor 48 (see FIG. 2) is, as mentioned, located immediately beneath the master brake cylinder 32 of the vehicle. When power is supplied to it, it pushes the piston in opposite direction to the former position of the piston rod.

A portion of the metal sheath 54 is shown attached to the rear of the motor 48. It carries within it wires 50 and 46. The ends of the wires 50 and 46 are connected to electrical contacts (not shown) of the motor 48. The motor has a piston rod 52 which is capable of assuming either a retracted position or a forwardly projected position with respect to the motor. When electrical power is provided to the motor 48, the power causes the motor to reciprocate the piston rod 52, from its original position to its opposite position. So, for example, if the motor has its piston rod 52 first in the projected position and the electrical key switch is then turned, electrical power, provided by the battery 40, will activate the motor and cause the piston rod to the retracted position. Alternatively, if the piston rod is in its retracted position and the key switch is then turned, electrical power is provided to the motor so that the piston rod will move to assume its forwardly projected position. In both the retracted and the projected position, upon reaching the full extension or retraction, the motor is automatically shut-off by an appropriate shut off switch contained within the housing of the motor.

A bracket 56 supports the motor 48 above a valve mechanism 60. The valve mechanism is connected to the master brake cylinder of the vehicle and the hydraulic lines of the vehicle. Rocker arm 62 is hingedly connected to the forward end of the reciprocal piston rod 52 and has its elbow portion 64 rotatively secured to the valve mechanism 60. The elbow portion 64 has a rod 65 extending through it and into the body of the valve mechanism 60. The rod 65 rotates as the elbow portion 64 rotates, a consequence of the movement of the piston rod 52 along with lever-like movement of the rocker arm 62. The valve mechanism is in fluid communication with the master cylinder by hydraulic lines 66 and 68. These lines are connected to the outlets of the master brake cylinder and allow for the transfer of hydraulic fluid from the master brake cylinder into the valve mechanism. The valve mechanism 60 has output lines 70 and 72 through which hydraulic fluid passes during proper operation of the brakes of the vehicle (anti-theft device "disarmed") which lines 70 and 72 are connected to hydraulic lines 34 and 76 (see FIG. 1). The valve mechanism comprises one way or check valves between the master cylinder and the hydraulic lines 34 and 76 such that, with the anti-theft device "armed" fluid can pass from master cylinder to brakes (when the brake pedal is depressed) but fluid cannot flow in the other direction, from calipers of the brakes back to the master cylinder.

With the anti-theft device in its inoperative or "shut-off" i.e., disarmed position, fluid from the master brake cylinder passes directly through lines 66 and 68, upon pressing the brake pedal in the vehicle, through the valve mechanism 60, through the lines 70 and 72, and into the hydraulic brake lines 34 and 76. The brakes thus act in their normal manner to stop the wheels. Release of pressure on the brake pedal allows the fluid to return to the reservoir of the master cylinder.

In an alternate embodiment of the invention, the key switch can be activated (the brakes locked) or deactivated (the brakes unlocked) by a hand-held, remote controlled device much in the same manner as current automobiles have remote controlled or keyless power door locks. Such a device is shown in FIG. 4. It has two buttons for selectively arming and disarming the device, two lights to visually indicate the mode of the device, "armed" or "disarmed", an internal source of electrical power, a battery, and a transmitter for directing a signal to a receiver located on the vehicle. These components are all fully understood by those of ordinary skill in the art.

To operate the anti-theft device (when the driver parks the vehicle and wants to insure that the vehicle is rendered theft-proof) the key is inserted into the key switch 42 and turned so as to activate the anti-theft device. Rotation of the key within the key switch 42 causes electrical power to be provided to the motor 48 which reciprocates the piston rod 52 causing the rocker arm and the elbow to rotate with respect to the valve mechanism. Rod 64 rotates with respect to the interior of the valve mechanism. When the device is "armed", the valve mechanism, as mentioned, blocks the hydraulic fluid from moving from the brakes back to the master brake cylinder. The one-way valving, however, allows for fluid to flow from the master cylinder, through the hydraulic lines 70 and 72, and into the brakes (if the brake pedal is depressed). If the driver first depresses the brake pedal and, thereby, forces hydraulic fluid into the brakes and, then activates the key switch so as to block the hydraulic fluid from returning back to the reservoir of the master brake cylinder, then, upon removing the key, removing his foot from the brake pedal and leaving the vehicle, the brakes are in their locked position. Hydraulic fluid is prevented from returning to the master brake cylinder since the return of the hydraulic fluid through lines 70 and 72 is blocked by the valve. In an alternative "arming" operation, the vehicle operator switches the key switch without first depressing the brake pedal. This arms the vehicle's anti-theft brake-locking system without putting constant hydraulic pressure on the brakes. When a would-be thief gains access to the car, hot wires the same to start the engine and tries to drive away, the first time he depresses the brakes (in modern cars, this must occur to change the car to a "drive" gear) the hydraulic fluid will travel from master cylinder or reservoir to brakes and, thus, the brakes will become locked. The one-way valves allow fluid to lock the brakes yet prevents the fluid from flowing back to the reservoir, even if the brake pedal is no longer depressed.

When the driver returns to the vehicle and desirably operates the same, the driver will insert the key into the key switch 42, turn the same and thereby provide electrical energy, via the battery, to the motor 48. This, in turn, causes the piston rod to reciprocate and pulls the rocker arm to its unblocking position. In this orientation, the hydraulic fluid is able to freely flow from the master cylinder to the brakes of the vehicle, and to return to the reservoir, when and if the vehicle operator or driver depresses or removes pressure from the brake pedal, respectively.

This invention has been described with a preferred embodiment, but other variations of the invention will be apparent to those of ordinary skill in the art without departing from the scope of the invention that is set forth in the appended claims.

I claim as follows:

1. An anti-theft device for a vehicle equipped with a) automatic transmission, b) a safety mechanism requiring simultaneous depression of a brake pedal along with placing the vehicle into a drive gear, and c) a hydraulic brake system having a hydraulic fluid reservoir and hydraulic fluid-carrying lines fluidly connected to the brakes, the brake system, when the anti-theft device is unarmed, providing hydraulic fluid in a conventional manner from the fluid reservoir to the brakes of the vehicle selectively upon depressing the brake pedal and returning said fluid to said fluid reservoir upon removal of pressure from said brake pedal, said anti-theft device comprising:

(a) a valve mechanism having two positions, namely a first unarmed position allowing conventional hydraulic fluid flow between said fluid reservoir and said brakes when said brake pedal is depressed and reverse fluid flow when pressure is removed from said brake pedal and a second armed position blocking fluid flow from said brakes of said vehicle back to said fluid reservoir but allowing fluid flow from said fluid reservoir to said brakes when said brake pedal is depressed, said valve mechanism being solely mechanically interconnected between said fluid reservoir and said brakes; said valve mechanism selectively moving between said first unarmed position and said second armed position by valve switching means physically isolated from said hydraulic fluid; and (b) said valve switching means comprising an electric motor mechanically connected to said valve mechanism for selectively changing the position of said valve mechanism between said first unarmed and second armed positions, said electric motor being connected to a source of electric power of said vehicle, said electric motor maintaining said valve mechanism in either said first unarmed or second armed position even in the event of a loss of electric power to said electric motor, and (c) an arming/unarming means electrically connected to said source of electric power of said vehicle and to said electric motor and, upon using an unlocking/locking mechanism for said arming/unarming means, causing said electric motor to activate said valve switching means to cause said valve mechanism to change between said first unarmed position and said second armed position.

2. An anti-theft device for a vehicle as claimed in claim 1 wherein said unlocking/locking mechanism is a remote controlled device.

3. An anti-theft device for a vehicle as claimed in claim 1 wherein said arming/unarming means is a key switch.

4. An anti-theft device for a vehicle as claimed in claim 1 wherein said arming/unarming means is located in and through a structural support of a frame of said vehicle.

5. An anti-theft device for a vehicle as claimed in claim I wherein said arming/unarming means is electrically connected to said source of electric power and said electric motor by wires which pass through a structural frame element of said vehicle.

6. An anti-theft device for a vehicle as claimed in claim 1 wherein substantially all electrical connections between said arming/unarming means, said source of electric power and said electric motor are housed in protective sheathing.

7. An anti-theft device for a vehicle as claimed in claim 1 wherein said arming/unarming means is electrically connected to a battery of said vehicle.

* * * * *